P. GENESTE.
STEPPED LENTICULAR SYSTEM FOR HEAT AND LIGHT CONCENTRATING TO BE USED ON FLYING MACHINES.
APPLICATION FILED JUNE 8, 1920.

1,390,258.  Patented Sept. 6, 1921.
2 SHEETS—SHEET 1.

INVENTOR:
PHILIPPE GENESTE
ATTORNEY

P. GENESTE.
STEPPED LENTICULAR SYSTEM FOR HEAT AND LIGHT CONCENTRATING TO BE USED ON FLYING MACHINES.
APPLICATION FILED JUNE 8, 1920.
1,390,258.
Patented Sept. 6, 1921.
2 SHEETS—SHEET 2.
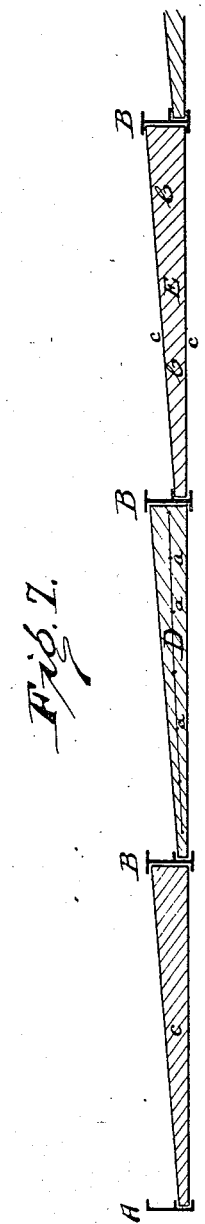
Philippe Geneste INVENTOR.
BY
ATTORNEY.

UNITED STATES PATENT OFFICE.

PHILIPPE GENESTE, OF CHATEAU DE CHAPEAU CORNU, VIGNIEU, FRANCE.

STEPPED LENTICULAR SYSTEM FOR HEAT AND LIGHT CONCENTRATING TO BE USED ON FLYING-MACHINES.

1,390,258. Specification of Letters Patent. Patented Sept. 6, 1921.

Application filed June 8, 1920. Serial No. 387,505.

*To all whom it may concern:*

Be it known that I, PHILIPPE GENESTE, a citizen of the French Republic, and resident of Chateau de Chapeau Cornu, Vignieu, Isère, France, have invented certain new and useful Improvements in Stepped Lenticular Systems for Heat and Light Concentrating to be Used on Flying-Machines, for which I have filed an application in France April 12, 1918, of which the following is a specification.

The present invention has for its object lenticular systems intended for being applied to the planes of flying machines, in order to form an aerial heat and light accumulator, said lenticular systems comprising spherical or cylindrical segments.

With this object in view the frame of the surface or plane, may be of wood or metal provided with transverse and longitudinal bars and eventually with trelliswork and in the rectangular spaces thus formed the lens segments are secured.

The lenticular systems intended to form an aerial heat and light accumulator may be composed of solid segments made of glass, crown glass, flint glass or the like or of hollow transparent segments made of glass, celluloid and the like and containing refractive liquids or gases.

Such segments may be of spherical or cylindrical shape and have a convenient curvature for concentrating the rays at a convenient distance and producing a desired effect.

The large dimensions of such accumulators forming the sustaining planes of flying machines allow of extremely high temperatures being obtained in the vicinity of the lenticular focus. The thus concentrated rays sweeping for instance over men of war, railway trains, deposits of explosive material, trains of automobiles carrying troops or ammunition and the like enemy formations, it may be understood that flying machines of such kind are a valuable asset to the national defense.

Furthermore flying machines provided with such lens systems forming the planes, may be used for heating the ground, hastening the germination of seeds or the maturity of crops, melting snow, evaporate the water of saltworks, and generally for heating and drying purposes. Of course in the last named applications, the temperature should not be very high. Finally, as light accumulators they may be used for detecting under sea boats and the like.

The required temperature may be got in any particular case by flying at the required height. When the machine is flying at a small distance from the ground, the bundle of calorific rays becomes larger, its temperature decreases.

Scientific experiments made by Buffon in France in 1745 with a lens of 0m 60 diameter having gradations, have proved that temperatures of 2000 degrees C., may be attained, whereby platinum and quartz are melted. It may be understood that with lenses of two hundred times the cited dimensions, (admitting a flying machine of 20 meters span across the wings), very high temperatures may be got. In a flying machine having 20 meters span, the rectangular bundle of calorific rays emitted by the plane system would have a length of 3 meters, which would sweep over the objects on the ground during about $\frac{1}{4}$ to $\frac{1}{2}$ of a second, according to the velocity of the flight.

The device is shown by way of example in the accompanying drawing, in which:

Fig. 2 is a cross section on line A—B of a divergent lenticular system for light gases, while

Fig. 7 is an enlarged sectional view of a portion of an aeroplane wing showing three lens elements inserted into the frame.

Figs. 8 and 9 show diagrammatical views of a plane with the invention applied.

Figure 1:
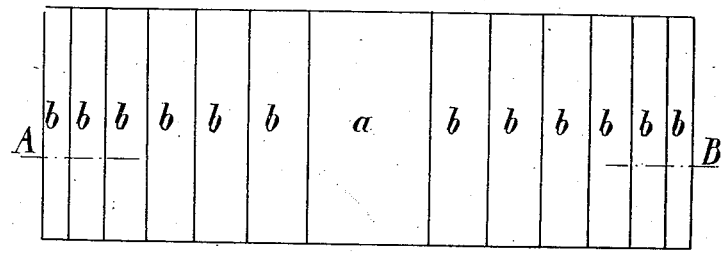
Figure 1 is a plane view of a lenticular system having cylindrical segments.
Figure 2:
Figure 3:
Fig. 3 is a cross section of a convergent lenticular system for solid substances, liquids or heavy gases.
Figures 4, 5, 6:
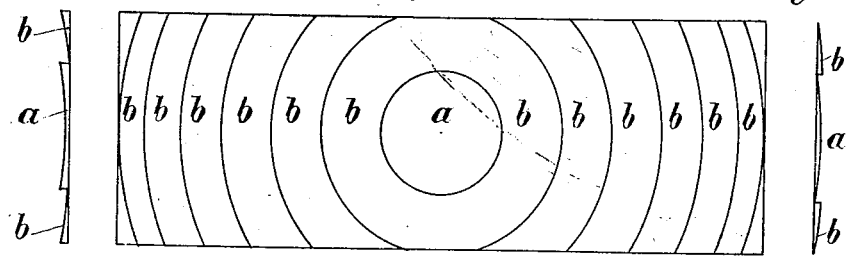
Fig. 4 is a top plane view of a lenticular system having spherical segments.
Fig. 5 is a transverse section through the line C—D of a divergent lenticular system for light gases.
Fig. 6 is a transverse section through the central line C—D of a system forming a convergent lens.

In the drawings, $a$ designates the central lens and $b, b$ the steps or gradations of a lenticular system of cylindrical shape in Figs. 1 to 3 while in Fig. 4 $a$ shows the central lens, $b, b$ the stepped annular concentrically disposed segments of a lenticular system of spherical shape.

A—B is the frame into which are inserted three lens elements, the first one being of solid glass as C, the second one of solid glass as D with reinforcing wire net $d$, while the third one E being formed with an envelop $e$ containing a gaseous or liquid fluid $f$.

Of course the lenticular system may have various convergent forms, such as for instance convexo convex, plane and convex and the like or various divergent forms, concavo-concave, plane and concave and the like.

The divergent formations are applied to gases having a coefficient of refraction lower than that of atmospheric air and the convergent ones are used with solid bodies or liquids or with gases having a higher coefficient of refraction than atmospheric air.

Owing to the large dimensions of such heat and light accumulators, high temperatures may be produced around the lenticular focus so that the bundle of rays passing above the troops of the enemy may instantaneously disable a number of same.

Inventor does not claim any features for covering the lenticular device when it is not made use of it, nor any means for supporting the same on the frame of the planes. The device may be applied to any kind of flying machines and such features may be readily constructed by the persons skilled in the art.

Having now fully described my said invention, what I claim and desire to secure by Letters Patent, is:

1. The combination with a plane of a flying machine, of a lenticular system having a focus beyond the plane applied thereto for forming a light and heat accumulator.

2. The combination with an exposed portion of a flying machine, of a lens applied to such portion to concentrate the rays of energy at a point below the flying machine.

3. The combination with the wing of a flying machine, of a system of lens carried thereby to concentrate the light and heat rays at a point below the flying machine.

In testimony whereof I have hereunto set my hand in presence of two witnesses.

PHILIPPE GENESTE.

Witnesses:
FRANK B. HALL, JR.,
JULIAN KEMBLE SUEDBERG.